United States Patent
Huber et al.

(10) Patent No.: US 7,694,827 B2
(45) Date of Patent: Apr. 13, 2010

(54) METHODS OF REDUCING THERMO-OXIDATION OF POLYMERS SUCH AS POLYACRYLONITRILE

(75) Inventors: Bernd Huber, Kelheim (DE); Robert Helstroom, Petersham (AU)

(73) Assignees: Commonwealth Scientific & Industrial Research Organisation, Campbell (AU); Kelheim Fibres GmbH, Kelheim (DE)

( * ) Notice: Subject to any disclaimer, the term of this patent is extended or adjusted under 35 U.S.C. 154(b) by 724 days.

(21) Appl. No.: 10/514,025

(22) PCT Filed: Jun. 11, 2003

(86) PCT No.: PCT/AU03/00726

§ 371 (c)(1),
(2), (4) Date: Jun. 20, 2005

(87) PCT Pub. No.: WO03/103815

PCT Pub. Date: Dec. 18, 2003

(65) Prior Publication Data

US 2005/0279699 A1    Dec. 22, 2005

(30) Foreign Application Priority Data

Jun. 11, 2002    (AU) ...................... PS2897

(51) Int. Cl.
*B01D 39/00* (2006.01)
*B01D 39/16* (2006.01)
*B01D 71/42* (2006.01)
*B01D 53/00* (2006.01)

(52) U.S. Cl. .............. 210/500.43; 210/500.25; 210/500.27; 210/500.35; 210/503; 210/505; 210/509; 55/527; 55/528; 442/417

(58) Field of Classification Search .............. None
See application file for complete search history.

(56) References Cited

U.S. PATENT DOCUMENTS

| | | | |
|---|---|---|---|
| 3,930,886 A | 1/1976 | Mesiti et al. | |
| 4,118,225 A | 10/1978 | Dobo | |
| 4,540,625 A * | 9/1985 | Sherwood | ............... 442/365 |
| 5,928,785 A | 7/1999 | Nishida et al. | |
| 6,197,708 B1 | 3/2001 | Yoshida et al. | |

FOREIGN PATENT DOCUMENTS

| | | |
|---|---|---|
| EP | 0 328 119 | 8/1989 |
| EP | 0 328 119 A2 | 8/1989 |
| EP | 0 920 897 A1 | 6/1999 |
| JP | 3-270734 | 12/1991 |
| JP | 6-154528 | 6/1994 |
| JP | 8224457 | 9/1996 |
| JP | 9220417 | 8/1997 |
| JP | 10-140420 | 5/1998 |
| JP | 11-151408 | 8/1999 |
| JP | 2000-312809 | 11/2000 |
| JP | 2000-312809 A | 11/2000 |
| WO | 94/11556 | 5/1994 |

OTHER PUBLICATIONS

Derwent Abstract Accession No. 2001-074952/09.
Derwent Abstract Accession No. 2001-105543/12.
Gonsalves. "Synthesis of acicular iron oxide nanoparticles and their dispersion in a polymer matrix." *J. of Materials Science.* vol. 36. 2001. pp. 2461-2471.
Janzen et al. "Characteristics of $Fe_2O_3$ nanoparticles from doped low-pressure $H_2/O_2/Ar$ flames." *J. of Nanoparticle Research.* vol. 1. 1999. pp. 163-167.
Xia et al. "Novel Route to Nanoparticles Synthesis by Salt-Assisted Aerosol Decomposition" *Advanced Materials.* vol. 13. No. 20. 2001. pp. 1579-1582.
Mori et al. "Titanium dioxide nanoparticles produced in water-in-oil emulsion." *J. of Nanoparticle Research.* vol. 3. 2001. pp. 219-225.

* cited by examiner

*Primary Examiner*—Krishnan S Menon
(74) *Attorney, Agent, or Firm*—Merchant & Gould P.C.

(57) ABSTRACT

A filter comprising a polymer material comprising a polymer matrix such as polyacrylonitrile containing dispersed metal oxide particles. The metal oxide particles are for example ferric oxide particles, and the polymer material contains generally 0.25-3% by weight of these particles. The filters are resistant to thermo-oxidation and have reduced shrinkage or degradation.

17 Claims, No Drawings

METHODS OF REDUCING THERMO-OXIDATION OF POLYMERS SUCH AS POLYACRYLONITRILE

FIELD OF THE INVENTION

The present invention relates to methods of reducing oxidation and/or shrinkage of polymers in high temperature environments. The present invention relates to a broad range of polymers, including acrylic polymers.

BACKGROUND OF INVENTION

Polyacrylonitrile (PAN) is an acrylic polymer commonly used in many forms. It is manufactured by polymerisation of acrylonitrile monomer ($CH_2.CHCN$) using the solution, suspension or emulsion methods. Typically, a small percentage of co-monomer (such as methacrylate —$CH_2$:$CHCOOCH_3$, or vinyl acetate —$CH_2$:$CH$—$O$—$CO$—$CH_3$) is incorporated into the polymer chain to control crystallinity and hence to modify some physical properties of the polymer. The amount of co-monomer in PAN usually ranges from 0 to 15%. Generally PAN is considered to be a homopolymer (ie: $(CH2.CHCN)_n$) when it contains less than 2% co-monomer.

Molecular weight of PAN can range from 10,000 to 500,000 or more and is closely controlled within the polymerisation process as it has a strong effect on both the efficiency of the polymer production process and the physical properties of the end product.

The basic form of PAN is a fine white powder. In manufacturing PAN materials, this powder is usually dissolved in a solvent (eg, dimethyl formamide, dimethyl acetamide or water-based sodium rhodamide) and the resulting polymer solution (or "dope") is either cast in the form of a film or spun as a fine fibre. Fibres based on a copolymer PAN are used for a wide variety of textile applications—as knitwear or as a woven fabric for clothing or home textiles. The fibrous form of homopolymer PAN is commonly used for manufacturing a wide variety of woven or felted materials for technical end uses or as a reinforcing element in composite materials (such as brake linings or concrete).

Because of its high level of chemical resistance, homopolymer PAN is also used in various industrial processes and products. Filter materials for both dry and wet applications are commonly made out of PAN.

Fabric filters using PAN fibres for particle collection are seeing widespread use for gas cleaning in many industrial processes. They have a high collection efficiency and produce a gas stream with a very low level of particulates. Operating costs may, however, be considerable as the filter bags must be replaced when either the pressure drop across the filter, or the rate of bag failures, or the level of dust emissions become excessive. The removal of particles of unburnt ash from coal-fired power station exhaust gases is one specific example. Depending on the design of the plant, such a filter material might have to operate at temperatures of up to 135° C. in a flue gas environment containing gaseous oxides of nitrogen and sulphur as well as water, carbon dioxide, nitrogen and oxygen. PAN filter material is well suited to this purpose and has been widely employed in the filters of large power stations of Australia, South Africa, and elsewhere.

One disadvantage of polyacrylonitrile is its susceptibility to shrinkage. The shrinkage of polyacrylonitrile and other polymers used in high extreme conditions (such as high temperature and oxidative conditions) is generally a consequence of oxidation of the polymer. Even in the reduced oxygen environment of combustion flue gas, the rate of PAN oxidation is significant at temperatures above 115° C. Such oxidation causes the PAN to shrink and to become brittle and lose strength. It frequently leads to premature physical failure of the filter media under the combined effects of growing tensile forces and reduced tensile strength.

While it is possible to introduce standard organic antioxidants into PAN, these are quickly decomposed or migrate out of the crystalline structures in the polymer matrix at high temperatures.

Filters for use in high temperature environments are also made from other polymer materials that are, to a greater or lesser degree, also prone to shrinkage due to oxidation. These include polyesters, polyamides, polyolefins such as polypropylene, polyaramids such as Nomex™, fluorocarbon fibres such as polytetrafluoroethylene and polyphenylene-based polymers such as polyphenylene sulphide.

SUMMARY OF INVENTION

According to one embodiment, the present invention provides a filter comprising a polymer material comprising a polymer matrix containing dispersed metal oxide particles.

According to another embodiment, there is provided a use of a polymer material comprising a polymer matrix and a metal oxide in the manufacture of a filter.

According to a third embodiment, the present invention provides for the use of a polymer material comprising:
 a polymer matrix selected from polyacrylics, polyesters, polyamides, polyolefins, polyaramids, fluorocarbon polymers and polyphenylene polymers, including copolymers and derivatives thereof, and mixtures thereof, and
 a metal oxide, in an environment having a temperature of at least 100° C.

An example of such an environment is a flue gas environment. Accordingly, the polymer material may be used in a component of flue gas treatment plant.

DETAILED DESCRIPTION OF THE INVENTION

The present applicants have surprisingly found that the inclusion of metal oxide in materials formed from polymeric materials such as filters intended to be used in high temperature environments, protects the polymer from oxidation (ie thermo-oxidation) and/or degradation, such as shrinkage.

The term filter is used in its broadest sense and encompasses a filter unit, as well as the filtering component of such units. This filtering component is also referred to as the "filter material" or "filter media".

The term metal oxide refers to the class of metal oxides having more than one possible oxidation state. This therefore excludes the alkali and alkaline earth metal oxides such as magnesium oxide, and encompasses the transition metal oxides including, notably, zinc oxide, nickel oxide, iron oxide, copper oxide and cobalt oxide. A mixture of metal oxides or a mixed metal oxide may be used.

Iron oxide is suitably the metal oxide used. The iron oxide is preferably ferric oxide ($Fe_2O_3$).

The metal oxide is present in the polymer matrix in particulate form. Although any particle size will have an affect on the preservation of the polymer, it has been found that the metal oxide is particularly effective in the form of fine particles. Such particles are preferably less than 1 μm ($10^{-6}$ meter) in size, and more preferably less than 500 nm in size. For best effect, the particles may be as small as 10 nm ($10^{-8}$ meter) in diameter.

Such particles can be produced standard ultra-fine grinding techniques or variants thereof using standard equipment, such as a ball mill. Processes which maximise particle dispersion are advantageous to avoid clumping and improve homogeneity in the product. Some of the more recently developed methods are suitable for forming the particles, including the following:

Gonsalves K. E., et al., Synthesis of Acicular Iron Oxide Particles and their Dispersion in a Polymeric Matrix. *J. Mater. Sci.* 2001: 36: 2461-71.

Janzen C., et al., Characteristics of Fe2O3 Nanoparticles from Doped Low Pressure H2/O2/Ar Flames. *J. Nanopart. Res.* 1999: 1:163-7.

Puntes V. F., et al., Synthesis of Colloidal Cobalt Nanoparticles with Controlled Size and Shapes. *Top. Catal.* 2002: 19(2): 145-8.

Xia B. I., et al., Novel Route to Nanoparticle Synthesis by Salt-Assisted Aerosol Decomposition. *Adv. Mater.* 2001: 13(20): 1579-82.

Mori Y., et al., Titanium Dioxide Nanoparticles Produced in Water-In-Oil Emulsion. *J. Nanopart. Res.* 2001: 3: 219-25.

Unlike conventional organic antioxidants, these metal oxides, such as $Fe_2O_3$, are stable at high temperatures and have been found not to migrate out of the polymeric structure.

Greater concentrations and finer particle size dispersion of metal oxides increase the resistance of the polymer matrix to oxidation.

The amount of metal oxide in the polymer material should be an amount sufficient to reduce the tendency of the polymer to oxidise in high temperature environments when compared with the same polymer not including the metal oxide.

Preferably, the metal oxide constitutes a maximum of 5% by weight of the polymer material. At higher levels, the metal oxide can lead to brittleness of the polymer material reducing the mechanical strength and elasticity. Preferably, the metal oxide constitutes a minimum of 0.1% by weight of the polymer material. The preferred range of inclusion of the metal oxide is from 0.25% to 3% by weight of the polymer material.

The polymer matrix is suitably chosen from one or more of the range of polymers which are prone to oxidation. This includes polyacrylics, polyesters, polyamides, polyolefins, fluorocarbon fibres and polyphenylene polymers, including copolymers and derivatives thereof and mixtures thereof. References to "polymers" encompasses co-polymers, unless the context is to the contrary. The term "polyacrylics" encompasses mondacrylics, and any acrylic-containing polymers, notably those based on acrylic acid and its esters and derivatives. The term "polyolefins" encompasses the broad range of vinyl polymers including polypropylene, polyvinyl esters, polyvinyl ethers, polyvinyl acetates, polystyrenes, and halogenated polyvinyls, including polyvinylidene chloride. An example of a polyaramid is Nomex™. Fluorocarbon polymers encompass those polymers containing fluorine atoms, such as polytetrafluoroethylene. Such polymers may also be classified in ether polymer classes such as polyolefins. Polyphenylene polymers encompass polymers such as polyphenylene sulphide.

According to one embodiment, the polymer is a polyacrylonitrile-containing polymer, or a derivatives thereof such as methacrylonitrile. The polymer may be polyacrylonitrile (PAN) or a copolymer of acrylonitrile with one or more other monomers. Suitable comonomers include acrylics other than acrylonitrile (such as methacrylonitrile); acrylamides and their derivatives (including methacrylamide); acrylic acid and its esters and derivatives thereof (including methacrylic acid and its esters); olefins and derivatives thereof including vinyl esters and ethers such as vinyl acetate, vinyl butyrate or vinylbutrylether, together with styrene and vinyl halogens such as vinyl chloride and vinylidene chloride; and maleimides.

In the situation where the polymer matrix is based on acrylonitrile, it is preferred that the polymer material comprises at least 85% acrylonitrile, more preferably at least 95% and most preferably at least 99% acrylonitrile by weight. Preferably the co-monomer content ranges from 0 to 10%, and more preferably from 0 to 5% by weight of the polymer material. Preferably, the average molecular weight of the polymer is between 100,000 and 300,000.

Suitably, the components made from the polymer materials are in the form of filaments, fibres, yarns, webs, fabrics, mats, films or sheets, or a combination of these. The nature of these polymers is such that they are suitable for production into fibres or yarns, which may then be woven into flexible materials. Accordingly, they are most suitable for formation into flexible fabric-type filter media.

According to a further embodiment, the present invention provides a method of forming a filter, the method comprising:
providing a polymer matrix;
incorporating particulate metal oxide into the polymer matrix;
casting or spinning the product into a film or a fibre; and
forming the film or fibre into a filter material.

In dispersing the metal oxide into the polymer melt or solution, the best results are achieved when the individual particles of metal oxide are separated and distributed widely throughout the polymer matrix.

According to the present invention, there is provided a filter formed at least partly from a polymer material comprising:
a polymer matrix, and
a metal oxide, the metal oxide being incorporated into the polymer matrix in an amount to provide a polymer material that has a characteristic shrinkage rate of 0.2% or less per 1000 test hours in a flue gas environment of approximately 125° C.

The shrinkage test used to calculate the "characteristic shrinkage rate" involves the following:

(i) Forming a yarn from the polymer having a breaking strength of approximately 20 N (plus or minus 5 N);

(ii) Positioning the yarn in a flue gas environment at 125° C. (plus or minus 5° C.) and of approximately 7% oxygen content and under light tension that is no more than 2% of the breaking strength of the yarn;

(iii) Measuring and recording the changes in the length of the yarn at intervals of 24 hours for a period of up to 5,000 hours of flue gas exposure; and (iv) Calculating the percentage change in length of the yarn between two points in time separated by at least 500 hours and between which the length of the yarn has varied at a measurable and approximately constant rate. Preferably, the yarn length between the 4,000 hour point and the 5,000 hour point will be taken as an ideal indicator of the characteristic shrinkage rate of the polymer.

To comply with requirement (ii) set out above, the yarn is preferably positioned in a duct or a filter chamber of a flue gas cleaning system and subjected to the following steps:

(v) Attaching one end of a 5 metre length of the yarn to a fixed mounting point on the floor of the duct or filter chamber; and (vi) Looping the free end of the yarn over a pulley above the fixed end of the yarn, and tying an appropriately-sized weight to the free end of the yarn to apply to the yarn a tensile force no greater than 2% of the breaking strength of the yarn.

The change in length of the yarn is preferably measured by:

(vii) Coupling the pulley to a rotary position sensor that will turn freely as the length of the yarn changes to detect the change in length of the yarn.

It will be understood that the pulley used in the test set out above must be capable of turning freely as the length of the yarn changes so that the change in length of the yarn can be measured accurately, for example up to 0.02% of the length. It will also be appreciated that the diameter of the pulley should be chosen so that the sum of the frictional torques applied to the pulley shaft by its bearings, and by the rotary transducer (part of the rotary position sensor) does not impede the rotation of the pulley or significantly change the constant tension experienced by the yarn under the action of the tensioning weight.

The pulley and rotary position sensor must also be capable of withstanding the flue gas conditions for several thousand hours of uninterrupted testing. Preferably the output signal from the sensor is connected to an automatic data recording system for ease of testing and calculation of the characteristic shrinkage rate of the polymer. Other details concerning this test are set out in the Examples below.

In the aforementioned test for shrinkage under real operating conditions, a shrinkage rate for polyacrylonitrile of 0.5% per 1,000 test hours at 125° C. would be considered normal. To significantly reduce or prevent shrinkage, the incorporation of a metal oxide additive into such a polymer in the manner of the invention would suitably reduce that rate to less than 0.2% per 1,000 test hours.

The present invention also provides a filter formed at least partly from a polymer material comprising:
a polymer matrix, and
a metal oxide, the metal oxide being incorporated into the polymer matrix in an amount to provide a polymer material that has a characteristic shrinkage rate that is 40% or less compared to the characteristic shrinkage rate of a polymer material without the metal oxide measured over a test period of 1000 hours in a flue gas environment at approximately 125° C.

Although shrinkage is one notable example of degradation that impacts on filter performance, other forms of degradation are also evidence of oxidation of the polymer, including cracking and reduction in tensile strength.

DETAILED DESCRIPTION OF THE INVENTION

The present invention will now be described in further detail with reference to a non-limiting example of a polymer material of one embodiment of the invention. For the assistance in understanding the benefits of the polymer materials of the present invention
shrinkage results for a polymer of the prior art compared with a polymer of a preferred embodiment of the present invention shows improvement in the invention;
FTIR spectra for the polymer materials of the prior art and of the preferred embodiment of the invention prior to and post exposure to flue gas in a power station shows improvement.

EXAMPLE 1

20 kg of a polymer containing 99.5% by weight acrylonitrile and 0.5% by weight of methylacrylate with a relative viscosity of 3.0 was dissolved in 80 kg of dimethylformamide solvent at 90° C. 200 g of a fine ferric oxide ($Fe_2O_3$) powder with an average particle size of 200 nm was added to the dope and mixed in well. The dope was pressed through a spinneret with 5,000 holes of 60 μm diameter in a coagulation bath containing a mixture of solvent and water. The filaments were washed with water, 5-fold stretched in boiling water, treated with a fibre finish, dried on heated rollers, 2-fold stretched, heat-set, crimped and cut. The resultant fibres had a red-brown colour and textile properties of 2.1 dtex (decitex; corresponding to a diameter of approximately 15 μm as polyacrylonitrile has a density of approx 1.18 $g/cm^3$), 49 cN/tex (c=centi) and an elongation of 15%. The fibres were then spun into a folded yarn with a count of Nm 24/2, a strength of 29.5 cN/tex and an elongation of 13.5%. This yarn was then used in the production of a filter material.

EXAMPLE 2

A yarn was made by the method outlined in Example 1 so as to include a concentration of 1% by weight ferric oxide (200 nm) in conventional PAN. This polymer was found to have a reduced tendency to shrink when exposed to a high temperature environment for an extended period of time, and to exhibit significantly less oxidation (by between 30% to 40%) when compared to conventional PAN.

The tendency of the yarn of Example 2 to shrink was measured by the "characteristic shrinkage test" which is described in further detail below. The same yarn not including the metal oxide additive was also subjected to this test. It is noted that the two yarns were suspended under a light tension inside a filter chamber of a coal-fired power station where they were exposed to 125° C. flue gas (containing approximately 7% oxygen) for an initial period of more than 600 hours while their rate of shrinkage was continuously recorded. Ideally, this test would continue for several thousand hours to accurately determine the shrinkage rates of the yarns under the test conditions. The shrinkage rate of the yarn containing 1% $Fe_2O_3$ is seen to be negligible compared to that of the conventional yarn.

Further evidence of the effectiveness of this method for preserving polyacrylonitrile can be drawn from infra-red spectroscopic analysis of the modified and conventional PAN both before and after exposure to the high temperature atmosphere of the power station flue gas. The FTIR (Fourier Transform Infra-red) absorption spectra of the "new" (unexposed) conventional and modified yarns are compared with the FTIR spectra taken after more than 1000 hours of exposure in the power station flue gas atmosphere.

The peaks centered on 1700 $cm^{-1}$ wavenumber represent carboxyl and carbonyl functional groups arising from oxidation of the PAN. The peaks at for example 1450 and 2919 $cm^{-1}$ represent the $CH_2$ groups of the polymer. Because these peaks are relatively unaffected by such oxidation, they can serve as reference point for assessing the levels of absorbance. The strong peak corresponding to the nitrile group of the PAN molecule at 2242 $cm^{-1}$ can also serve as a satisfactory reference.

A comparison of the ratios of oxidation to reference peaks in the spectra of the two exposed yarns shows that degree of oxidation of the modified polymer is between 60% to 70-% that of the conventional yarn.

Greater concentrations and finer particle size dispersion of $Fe_2O_3$ increase the resistance of PAN to oxidation.

Characteristic Shrinkage Rate Test

A test was devised to assess the susceptibility of polyacrylonitrile and other polymers to shrinkage under extreme conditions. This test involves measuring the shrinkage rate, in a combustion flue gas environment, of a yarn formed from the polymer. This test is described in detail below.

The yarn to be tested preferably has a breaking strength of approximately 20 N and is of 5 meters (or greater) in length. In the test, one end of the yarn is attached to a fixed mounting point on the floor of a duct or filter chamber of the flue gas cleaning system. From this mounting point, the yarn travels vertically upwards for most of its length. At its upper reaches, the yarn is draped over a pulley and tied to a small weight. This weight applies a small tensile force of preferably no more that 2% of the ultimate tensile strength of the yarn. The pulley is attached to the shaft of a rotary position sensor that will turn freely as the length of the yarn changes. The diameter of the pulley is chosen so that the sum of the frictional torques applied to the pulley shaft by its bearings, and by the rotary transducer, does not impede the rotation of the pulley or significantly change the constant tension experienced by the yarn under the action of the tensioning weight. The rotary position sensor is preferably chosen so that it can resolve a 0.02% change in the length of the yarn. It must also be capable of withstanding the flue gas conditions for several thousand hours of uninterrupted testing. The output signal from the sensor is preferably connected to an automatic data recording system.

After being installed into the flue gas environment, the length of the test yarn is recorded in the aforementioned manner at regular intervals of preferably 24 hours or shorter over a test period that would preferably extend for a period of at least 5,000 hours (approximately seven months) of flue gas exposure. The temperature of the flue gas environment is also regularly measured and recorded.

A record of the length of the test yarn and the temperature of its environment is built up in this way and charted as a function of test time.

Over an initial period of the test that might extend to 1,000 hours or more, it is not uncommon to observe some degree of lengthening of the test yarn due to relaxation of mechanical stresses in the polymer under the applied tension. At a temperature of 125° C., such extension might be more than 1% of the length of the yarn. Beyond this point, however, the effect of thermo-oxidative degradation of the polymer will become apparent as the test yarn begins to shrink. At this point, it has been commonly (but not exclusively) found that the rate of shrinkage increases over the next thousand hours of the test as the effect of mechanical relaxation subsides and thermally-driven chemical reactions alter the structure of the polymer material. By the time an additional 1,000 to 2,000 hours of testing (at a temperature of 125° C.) have elapsed, it is commonly (but not exclusively) found that the rate of shrinkage becomes approximately constant. When more than 5,000 hours of total test time has elapsed at a temperature of preferably 125° C. or higher, an essentially constant rate of shrinkage is considered to be a characteristic property of the test material under conditions of stress arising from the thermo-oxidative test environment.

In the aforementioned test for shrinkage under real operating conditions, a shrinkage rate for polyacrylonitrile of 0.5% per 1,000 test hours at 125° C. is considered normal. To significantly reduce or prevent shrinkage, the incorporation of a metal oxide additive into such a polymer in the manner of this invention would reduce that rate to preferably less than 0.2% per 1,000 test hours.

The above examples serve to illustrate the principle of the invention only, and are not intended to limit the scope thereof. Various modifications can be made to the materials and methods described in the examples without departing from the spirit and scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention

The invention claimed is:

1. A filter formed at least partly from a polymer material comprising:
   a polymer matrix, and
   ferric oxide, the ferric oxide being dispersed in the form of individual particles being separated and distributed widely throughout the polymer matrix in an amount to provide a polymer material that has a characteristic shrinkage rate of 0.2% or less per 1000 test hours in a flue gas environment of approximately 125° C., wherein the ferric oxide constitutes from 0.25% to 3% by weight of the polymer material and the polymer matrix is a polyacrylonitrile-containing polymer, or a derivative thereof.

2. The filter according to claim 1, wherein the ferric oxide is in the form of particles less than 1 μm in size.

3. The filter according to claim 2, wherein the ferric oxide is in the form of particles less than 500 nm in size.

4. The filter according to claim 1, wherein the ferric oxide constitutes a maximum of 1% by weight of the polymer material.

5. The filter according to claim 1, wherein the ferric oxide constitutes a minimum of 0.1% by weight of the polymer material.

6. The filter according to claim 1, wherein the polymer matrix is polyacrylonitrile (PAN) or a copolymer of acrylonitrile with one or more other co-monomers.

7. The filter according to claim 1, wherein the polymer matrix is a copolymer of acrylonitrile and methacrylonitrile.

8. The filter according to claim 1, wherein the polymer material comprises at least 85% acrylonitrile.

9. The filter according to claim 7, wherein the polymer matrix comprises at least 95% acrylonitrile by weight.

10. The filter according to claim 7, wherein the polymer material comprises at least 99% acrylonitrile by weight.

11. The filter according to claim 6, wherein the co-monomer content ranges from 0 to 10%, by weight of the polymer material.

12. The filter according to claim 1, wherein the average molecular weight of the polymer is between 100,000 and 300,000.

13. The filter according to claim 1, wherein the polymer material is in the form of filaments, fibres, yarn, web, fabric, mat, film or sheet, or a combination of these forms.

14. The filter according to claim 13, wherein the polymer material is in the form of a flexible fabric, web or mat.

15. A filter formed at least partly from a polymer material comprising:
   a polymer matrix, and
   ferric oxide, the ferric oxide being dispersed in the form of individual particles being separated and distributed widely throughout the polymer matrix in an amount to provide a polymer material that has a characteristic shrinkage rate that is 40% or less compared to the characteristic shrinkage rage of the polymer material without the metal oxide measured over a test period of 1000 hours in a flue gas environment at approximately 125° C., wherein the ferric oxide constitutes from 0.25% to 3% by weight of the polymer material and the polymer matrix is a polyacrylonitrile-containing polymer, or a derivative thereof.

16. A polymer material comprising:
a polymer matrix, and
ferric oxide, the ferric oxide being dispersed in the form of individual particles being separated and distributed widely throughout the polymer matrix in an amount to provide a polymer material that has a characteristic shrinkage rate that is 0.2% or less compared to the characteristic shrinkage rage of the polymer material without the metal oxide measured over a test period of 1000 hours in a flue gas environment at approximately 125° C., wherein the ferric oxide constitutes from 0.25% to 3% by weight of the polymer material and the polymer matrix is a polyacrylonitrile-containing polymer, or a derivative thereof for use in an environment having a temperature of at least 100° C.

17. A polymer material according to claim 16, wherein the environment is a flue gas environment.

* * * * *